G. A. ROSSITER.
GYROSCOPIC COMPASS.
APPLICATION FILED FEB. 5, 1918.

1,311,716.

Patented July 29, 1919.
5 SHEETS—SHEET 1.

Fig. 1.

Witness
Byron B. Collings.

Inventor
G. A. Rossiter, by
Attorney

G. A. ROSSITER.
GYROSCOPIC COMPASS.
APPLICATION FILED FEB. 5, 1918.

1,311,716.

Patented July 29, 1919.
5 SHEETS—SHEET 2.

Witness
Byron B. Collings.

Inventor
G. A. Rossiter, by
Witherspoon
Attorney

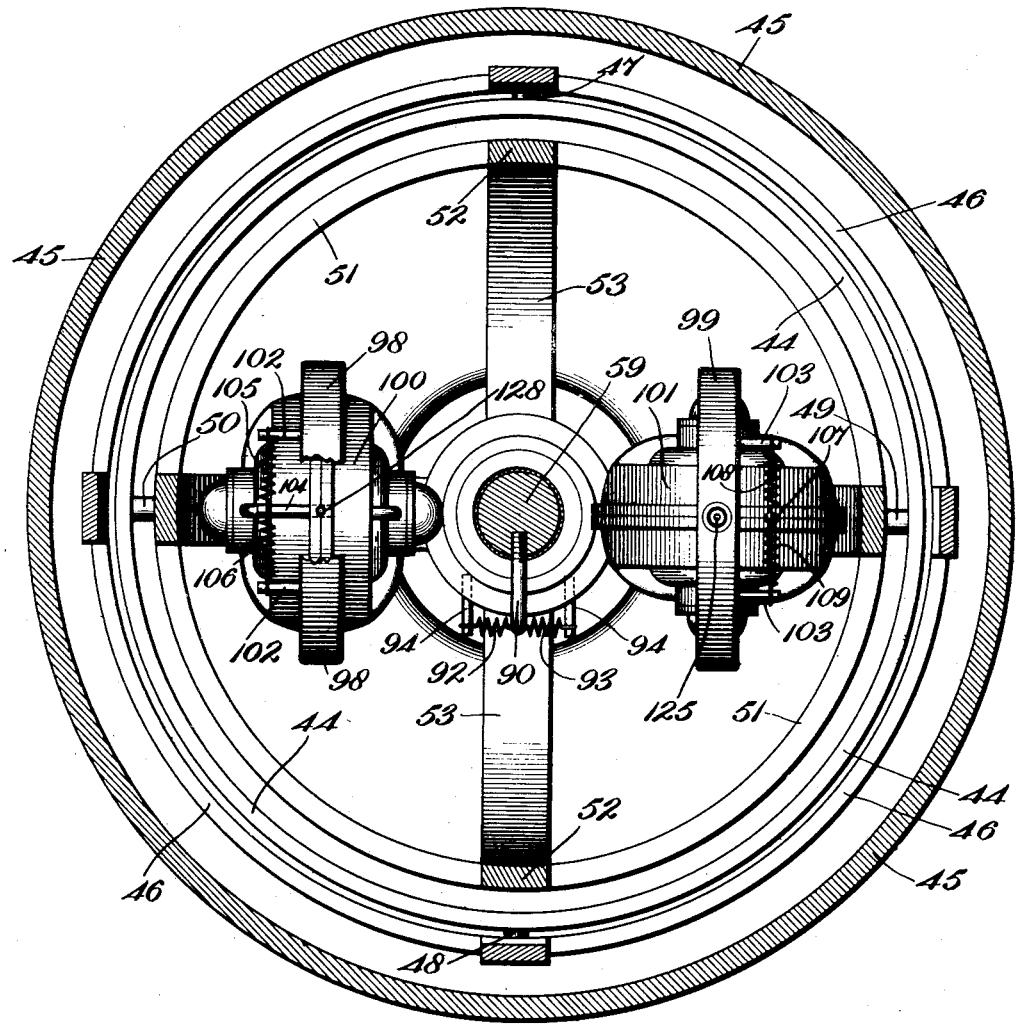

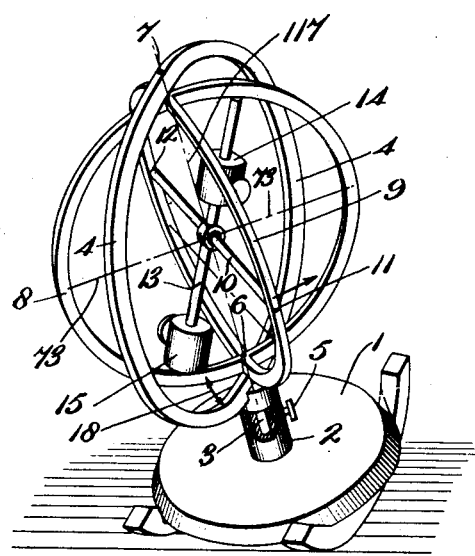
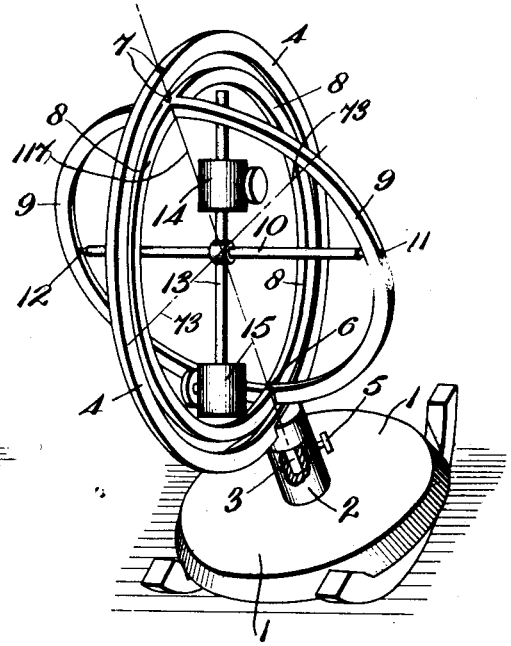
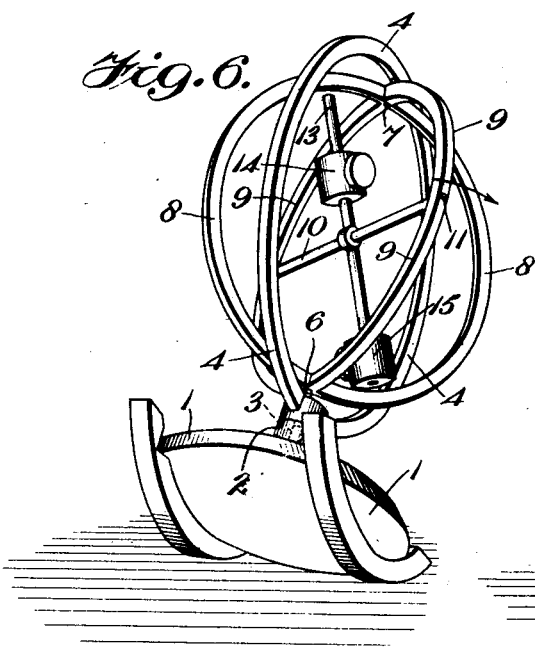
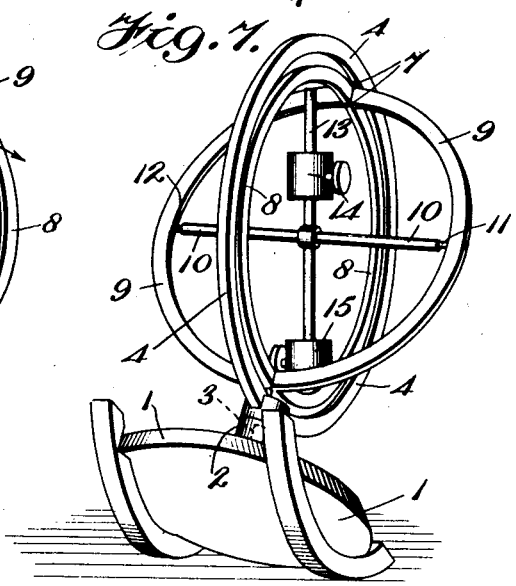

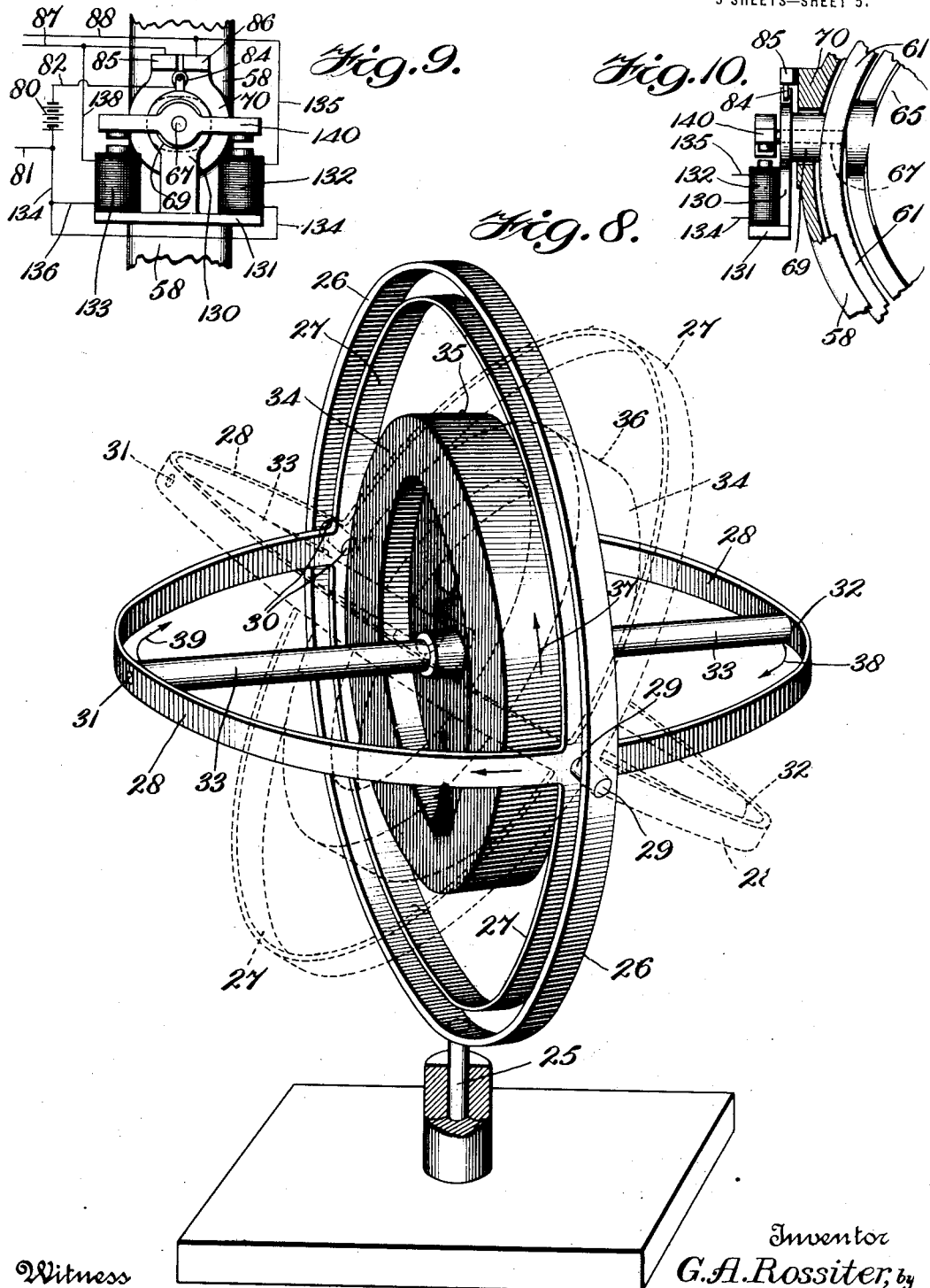

UNITED STATES PATENT OFFICE.

GEORGE A. ROSSITER, OF BROOKLYN, NEW YORK, ASSIGNOR TO THE CARRIE GYROSCOPIC CORPORATION, OF NEW YORK, N. Y., A CORPORATION OF NEW YORK.

GYROSCOPIC COMPASS.

1,311,716. Specification of Letters Patent. Patented July 29, 1919.

Application filed February 5, 1918. Serial No. 215,512.

*To all whom it may concern:*

Be it known that I, GEORGE A. ROSSITER, a citizen of the United States, residing at Brooklyn, in the county of Kings and State of New York, have invented certain new and useful Improvements in Gyroscopic Compasses; and I do hereby declare the following to be a full, clear, and exact description of the invention, such as will enable others skilled in the art to which it appertains to make and use the same.

This invention relates to gyroscopic compasses and has for its object to provide a compass of this nature which will be comparatively inexpensive to construct, and more certain in operation than those heretofore proposed.

With this and other objects in view the invention consists in the novel details of construction and combinations of parts more fully hereinafter disclosed and particularly pointed out in the claims.

Referring to the accompanying drawings forming a part of this specification in which like numerals designate like parts in all the views—

Figure 1 is an elevational view partly in section of a gyroscopic compass made in accordance with this invention;

Fig. 3 is a sectional plan view taken on the line 3—3 of Fig. 1, looking in the direction of the arrows;

Figure 2:
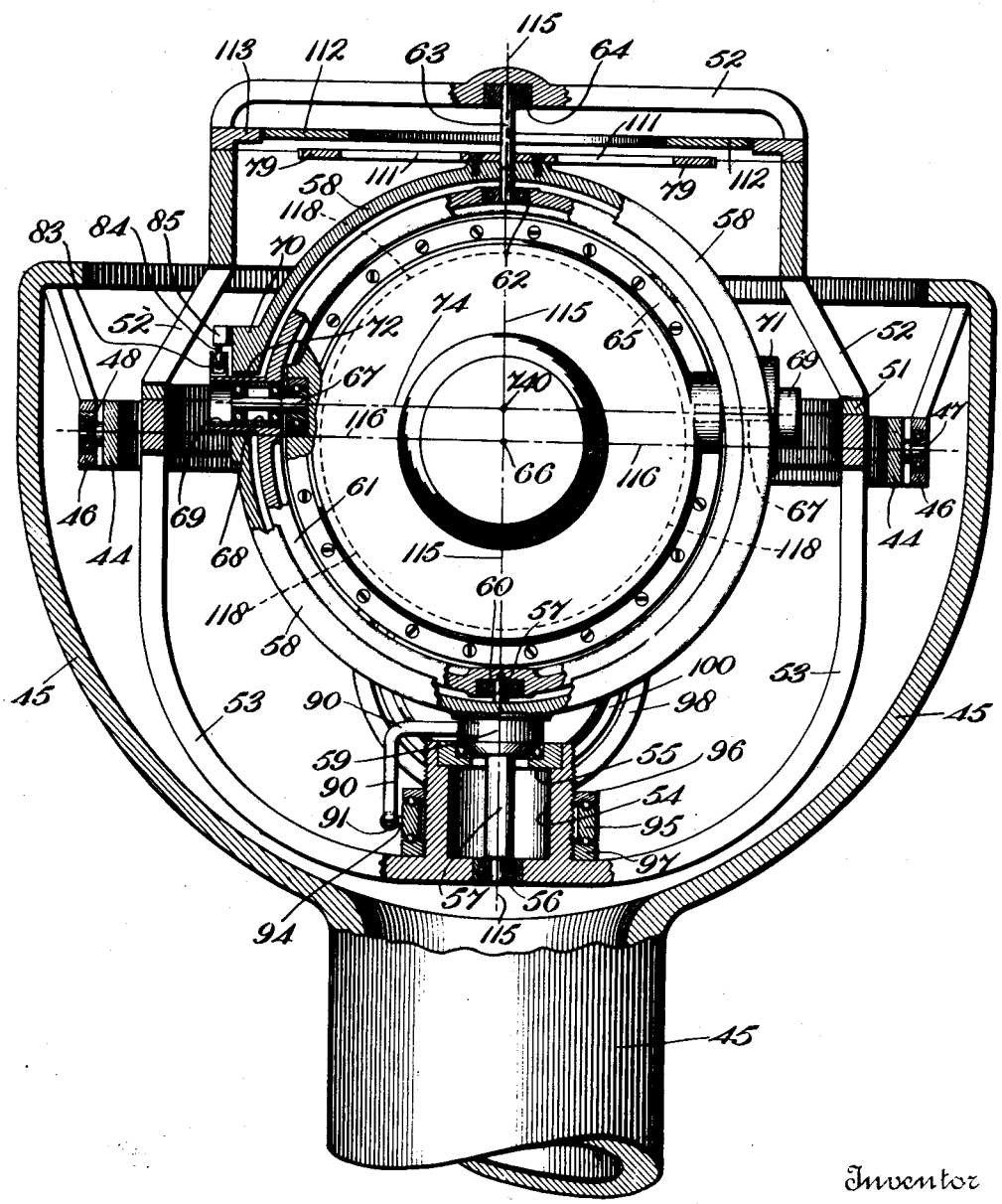
Fig. 2 is a view similar to Fig. 1, but showing the parts in positions at right angles to those illustrated in Fig. 1.

Figs. 4 to 7, inclusive, are diagrammatic perspective views of a mechanism in different positions serving to explain certain principles on which the invention rests;

Fig. 8 is a diagrammatic perspective view of a gyroscopic device of three degrees of freedom, serving to explain other principles on which the invention rests;

Fig. 9 is an end elevational view of an agitating means for the pivots 67 when the latter are in a somewhat modified form; and—

Fig. 10 is a side elevational view partly in section of the parts illustrated in Fig. 9.

In order that the precise principles involved may be clearly understood, reference is first had to Figs. 4 to 7, in which the rocking support 1 carries the standard 2, provided with the vertically disposed pivot 3, with which the outer ring 4 revolves. A set screw 5 controls the rotary movements of the ring 4 with relation to the standard 2, and freely pivoted as at 6 and 7, in said ring 4, are the rings 8 and 9 rigid with each other and set 90 degrees apart.

Diametrically disposed in the ring 9 is the axis 10 journaled in said ring as at 11 and 12; and rigid with the said axis is the rod 13, carrying the weights 14 and 15, which for purposes of illustration are located at different distances from said axis 10, so as to form a pendulous system with the weight 15 acting as a pendulum bob.

It will be shown below that the arrangement just described closely simultates the disposition of parts in a gyroscopic compass (hereinafter called a "gyro" or a "gyro compass"), for the rocking movements of the base 1 closely simulate the motions of a ship in a sea way, the line 73 simulates the horizontal axis 74 of said gyro, (see Fig. 2), when the center of gravity of the wheel 118 is swinging about said axis 74, and the line 117 simulates the vertical axis 115 of said gyro when the center of gravity of said wheel 118 is moving in azimuth.

Supposing the base 1 to be horizontal with the axis 3 and line or axis 117 in a vertical position, and with the circles 4 and 8 making an angle 18 with each other, then the rod 13 will be vertically disposed in the vertical line or axis 117, between the pivots 6 and 7 with the weight 15 centered over the pivot 6, and in line with the vertical axis 117.

Let us now rock the base in the plane of ring 4, from its horizontal position to the position shown in Fig. 4 without permitting the parts to turn on the pivots 6 and 7. The weight 15 is constrained by the axis 10 to follow the plane of the ring 8, and therefore, at the end of the rocking movement it finds itself not in its lowest position in the plane of ring 4, but elevated, so to speak, to one side of said last mentioned plane, as is clearly shown. Now, suppose while the parts are held thus tilted, as they appear in Fig. 4, that they are permitted to turn on the pivots 6 and 7. or around the axis 117. The weight 15 will at once seek its lowest position in the plane of ring 4, and the parts will assume the positions shown in Fig. 5.

That is to say, the ring 8 will have moved in a counterclockwise direction as seen from above, and through an angle 18, owing to the above tilting motion imparted to the base 1. This movement of the ring 8 is equivalent to a pressure at right angles to the axis 10, exerted on the pivot 11, in a counter clockwise direction, as seen from above, and this said pressure unless prevented in a gyro compass will cause a precessional error as will appear below.

Again, supposing the parts to be in the position shown in Fig. 4, and while holding them against rotation around the pivots 6 and 7 or vertical axis 117, let us reverse the rocking movement and bring them into the position shown in Fig. 6. Here again the axis 10 prevents rotation around the line or axis 73, and causes the weight 15 to follow the plane of the ring 8. It thus prevents said weight from reaching its lowest position in the plane of the ring 4. But if we release the parts and allow them to rotate around the axis 117, the weight 15 immediately seeks its lowest position in the ring 4, and brings the parts to the position shown in Fig. 7. Here again, the ring 8 has been turned through the angle 18 in a counter clockwise direction, as seen from above, and this turning movement is also equivalent to a pressure in the same direction on the pivot 11, and therefore, to a precessional movement in a gyro compass, in the same direction as before.

In other words, it is important that, notwithstanding the tilting movements of the table 1 have been in opposite directions, yet the turning or precessional movements of the ring 8 have been in the same direction as indicated by the arrows in Figs. 4 and 6. It will be shown below that the precessional errors of a compass due to the rolling and pitching movements of a vessel are in part due to the above pendulous actions of the center of gravity of the wheel system, and that this said portion of said errors are in the same direction, and are therefore additive.

Next, let us revolve the parts in Fig. 4 around the axis 3, until the common plane of the axis 10 and ring 9 is parallel to the rockers of the base 1, or until said common plane coincides with the plane of the rocking movement. Of course, in such case if the center of gravity of the weight 15 is exactly in the plane of the pivots 11 and 12, then said weight will not turn the ring 9 in either direction. On the other hand, if said center of gravity is located to the left of said common plane, then the weight 15 will turn said ring 9 in one direction when the rocking movement takes place, and will turn said ring 9 in an opposite direction when said rocking movement is reversed.

Again, suppose the center of gravity of the weight 15, instead of being located to the left of the plane of ring 9, as seen in Fig. 4, is located to the right thereof. As the above mentioned rocking movements take place in reverse directions the corresponding turning movements of the ring 9 will be reversed to those just described. Stated in other language, when the rocking movements of the base 1 take place in a plane at right angles to the common plane of ring 9, and axis 10, the resulting precessional movements are cumulative, but when said rocking movements take place in said common plane they are not cumulative, but are in opposite directions and are therefore more or less self-corrective.

It will therefore be clear that should the rocking movements of base 1 take place in various planes making various angles with the plane of ring 9, and axis 10, the corresponding precessional errors will be more or less cumulative, or more or less self-corrective according to the values of said angles.

In the same way, a like phenomena will be pointed out below in connection with the center of gravity of the wheel 118 when it swings around the axis 74 as a center and when it swings in a plane at right angles to said axis 74. The actions due to precessional movements in a gyroscope of three degrees of freedom will now be briefly discussed, and their relations to the above phenomena, and to a gyroscopic compass of two degrees of freedom will be more fully brought out.

Referring particularly to Fig. 8, 25 represents a vertical pivot corresponding to pivot 3 in Figs. 4 to 7, and 26 represents an outer ring in which the inner integral rings 27 and 28 are pivoted as at 29 and 30.

In the ring 28, as at 31 and 32, is journaled the rotating axis 33, carrying the rotating gyro wheel 34. If we suppose the wheel 34 to turn at a constant speed, and if we consider any particle 35 of wheel 34 which is rotating in the direction of the arrow 37, and if we exert a pressure thereon tending to move said particle from its full line position 35 to its dotted line position 36, then, and only then, while said particle is moving under said pressure it of necessity has a greater velocity than it had before said pressure was applied.

In other words, said pressure, while, and only while it lasts, accelerates the motion of said particle and it can be shown that a resolved component of the applied pressure will be exerted on the pivots 31 and 32 in the direction of the arrows 39 and 38. This component will cause the pivots 29 and 30 to turn around the pivot 25 in the direction of said arrows 28 and 39, and this turning movement around pivot 25 is known as precession. In the same way, should a pressure on the particle 35 be in a direction opposite to that just assumed, then the resolved component on the pivot 32, for example, will exert its force in a direction opposite to that of the arrow 28, and the pivots 29 and 30 will precess in an opposite direction.

In the discussion of Figs. 4 to 7, above, it was shown that the action of the weight 15 was to cause a precession of the parts in a direction opposite to that of the arrow 38; and now it will be clear, that if the ring 27 or 28, or frame of the gyro wheel should be weighted so that the center of gravity of the system will imitate the motions of the weight 15, then a precession of the parts will occur during rolling and pitching motions of a vessel due to its pendulous action.

Not only will such rolling movements of a vessel cause a precession of the pivots 29 and 30, around the pivot 25, in the manner just disclosed, but such precessional movements will cause the gyro wheel 34 and axis 33 to move into new positions as will be clear from the dotted lines of Fig. 8, and corresponding compass errors will result unless these movements are prevented as will more fully appear hereinafter. For example, when wheel 34 is rotating in the direction indicated, it is well known that if the pivot 29 is forcibly pressed on, or turned around pivot 25 in the direction of the arrow 38, then pivot 32 will be elevated, while if said pivot 29 be forcibly pressed on or turned in an opposite direction, the pivot 32 will be depressed and the wheel 34 occupy its dotted line position.

When it is remembered that the pendulous actions of the center of gravity of the wheel system around the axis 74 will, as explained in connection with weight 15, cause cumulative compass errors, when the ship rolls in opposite directions in certain planes, it at once becomes apparent how important it is to provide a stabilizing means capable of suppressing said actions, and therefore, preventing said errors from occurring at all.

The mechanism now to be described not only comprises an efficient stabilizing means, but it also involves a number of other features which will presently appear. Referring now more particularly to Figs. 1, 2 and 3, 45 represents any suitable binnacle or other means for supporting the compass on shipboard. Carried by said binnacle is the usual outer gimbal ring 46, inside of which is the inner gimbal ring 44, and said rings are joined at points 180° apart by the pivots 47 and 48, preferably mounted in the ball bearings shown. At 90° from said pivots 47 and 48 are the pivots 49 and 50, which are also 180° from each other, and which are likewise preferably mounted in a second set of ball bearings, (see Figs. 1 and 2).

Inside the inner gimbal ring 44 and carrying said pivots 49 and 50 is the frame or supporting ring 51, rigid with the upwardly extending frame member 52, and also rigid with the downwardly extending frame member 53 as shown. 54 represents an upwardly extending hollow supporting base member rigid with frame 53, 55 and 56 represent ball bearings adapted to guide the vertically disposed pivot 57, and 58 represents a so called floating ring or member rigid with the enlargement 59 resting on the bearing 55 as shown. The pivot 57 passes upwardly through the member 59 and terminates in the ball bearing 60 carried by the ring member 61, which also carries a ball bearing 62 located 180° from the bearing 60 and in which is mounted the vertically disposed pivot 63 having its upper end terminating in the ball bearing 64 carried by the frame 52.

Inside the ring member 61 is located the directive gyro wheel casing 65, and inside said casing is located the gyro wheel 118 and suitable motor mechanism not shown for rotating the same in a well known manner. The rotating axis of the wheel may be supposed to be journaled in the casing at the point 66, and the casing carries oppositely disposed pivots 67 which pivots are journaled in the tubular ball bearings 68 carried by tubular extensions 69 of the ring member 61.

Said extensions pass through bosses 70 and 71 on the floating ring member 58 provided with enlarged holes such as 72. Since the floating or follow up ring 58 must be capable of a slight movement independent of the ring 61, the holes 72, as best shown in Fig. 1, are preferably made elliptical.

It will be observed that a line 74 joining the pivots 67 or the axes of the extensions 68 passes above the center 66 of the wheel axis. In other words, the center of gravity of the wheel 118 is located below the common axis of the pivots 67 and therefore, the wheel system comprising casing 65, the motor, etc., is pendulous around the axis 74 as a center. If we suppose the center of gravity of the wheel system to be located on the line 116 perpendicular to a line joining the axes of the pivots 49 and 50, we will see at once that the common, or oscillating axis 74 joining the pivots 67 may be said to correspond to the line 73 drawn perpendicular to the axis 10 in Fig. 4, and that the center of gravity of the wheel system corresponds to the weight 15 in said figures. It follows that rolling motions of a ship in a sea way will cause precessional movements of the pivots 67 unless said movements are prevented, and that such movements will in turn cause compass errors as will presently appear.

75 represents a motor supported by the frame 52 and is provided with a pinion 76 meshing with the gear 77, carrying the pinion 78 meshing with the gear 79 mounted on the follow up or floating ring 58.

represents a source of current connected by the wire 81 to motor 75 and by wire 82 to the arm 83 carried by one of the extensions 69. Said arm 83 is provided with a suitable contact or roller 84 adapted to alternately make circuit with the contacts 85 and 86 respectively, joined to motor 75 by the wires 87 and 88.

The connections are so arranged that when the roller 84 makes circuit with contact 85, the motor will be so turned as to move the floating ring, or follow up member 58 in such a direction that said circuit will be immediately broken. And in like manner, when the circuit through the motor is made by the roller 84 joining the contact 86, the motor 75 will be reversed, and the follow up ring 58 will be turned in an opposite direction to immediately break said circuit.

It results in practice that the motor 75 is constantly and rapidly reversed, and that the follow up ring 58 is kept in a constant state of vibration. 90 represents an arm rigid with the follow up ring 58 and provided with an end 91 held between the springs 92 and 93 secured as at 94 to the ball bearing ring 95, supported between the collars 96 and 97 carried by the member 54. Rigid with the collar 95 are the arms 98 and 99 each terminating in a loop as shown, and in each loop is suitably mounted, as on ball bearing, a stabilizing gyroscope designated respectively by the numerals 100 and 101.

It will be observed that the said gyroscopes 100 and 101 are so disposed that their planes of rotation are at right angles to each other, and that the rings 98 and 99 are provided respectively with the pins 102 and 103. From the casing of gyro 100 extends the pin 104 which is held between the springs 105 and 106 joined to said pin 102, and from the casing of gyro 101 extends the pin 107 which is joined to the springs 108 and 109 connected to said pin 103. These springs, as will be clear from what follows, serve to maintain the two gyros at approximately right angles to each other, and they also serve to shorten the amplitude of the pendulous system.

Since one of the properties of a gyroscope is to resist any motion tending to change its plane of rotation, it is evident that the gyro 100 will resist motion around the common axis 116, of the pivots 47 and 48; that the gyro 101 will resist motion around the common axis of pivots 49 and 50 which is at right angles to said first named axis 116, and that any other motions at different angles to said common axis will be resisted by both gyros 100 and 101 in accordance with the values of said angles.

Mounted on the ring 61 are two arms 110 which pass outwardly beyond the follow up ring 58 and upwardly through openings such as 111 in the gear wheel 79. On these arms is mounted any suitable compass card 112. 113 represents a ring carried by the frame on which may be placed suitable graduations, or indications, to facilitate the reading of the card 112.

The operation of this improved gyroscopic compass, so far as has now been disclosed, is a follows:—

Referring to Fig. 2, and supposing the ship turns in azimuth, the binnacle 45 will transmit the motion to the ring 46, to pivots 47 and 48, to ring 44, to pivots 49 and 50, and to the pendulous supporting frame 53. The pivots 57 and 63 will be held stationary by the gyroscopic action of the rotating wheel 118 inside the casing 65 so that the ball bearings 55, 56 and 64 will revolve around said pivots thus generating a greater or lesser amount of friction. Any friction generated by the bearings 55 and 56 will tend to turn the follow up ring 58 in the same direction as the ship moves.

Let us suppose said ring is so moved as to cause the motor circuit to be made between the contacts 84 and 85. The motor 75 will at once be so turned as to cause said follow up ring to be moved, by means of the gears 76, 77, 78 and 79, in a direction opposite to that in which it was moved by friction; and therefore, the pivots 57 and 63 will be subjected to a turning movement in a direction opposite to the original movement and any errors due to friction that may otherwise have occurred, will be corrected for. As the motor circuit will be automatically broken when the contact 85 turns to its original position, this corrective, or reverse motion of the follow up ring 58 will not only be in the right direction, to correct errors due to friction, but it will be of the right angular amount.

Should the ring 58 be moved through friction in an opposite direction, or so that the motor circuit will be made through contact 86, then the torque on the pivots 57 and 63 or around the axis 115 will be opposite to that first supposed, the follow up ring will be turned by motor 75 in a direction opposite to that just supposed, and the corrective or compensative torque will also be in an opposite direction.

So, it follows that all friction due to the movements of the ship in azimuth and to pendulous supporting frame, relative to the gyro pivots, will be corrected, or compensated for, with the result that compass errors due to friction of all kinds will be eliminated. It will be clear that the springs 92 and 93 will prevent the oscillations of the ring 58, just disclosed, from disturbing the planes of rotation of the stabilizing gyros 100 and 101 for said oscillations are not permitted to have a value sufficient to disturb said planes. Next, to fix our ideas, let us suppose the center of gravity of the pendulous wheel system is located in the common plane of the vertical and horizontal axes represented by the lines 66 and 115, and suppose the rolling motions of the ship cause said center of gravity to move around the axis 74 passing through the pivots 67. From what has been said in connection with Fig. 4, it will now be clear that if said center of gravity of the wheel 118 moves in response to rolling motions of the ship around the axis 74 and in a plane substantially parallel to said axis, then when the parts are in one position there will be generated a tendency to cause a precession of the pivots 67, around the axis 115, and also that this precessional tendency will be cumulative as the said rolling motions reverse.

On the other hand, it will also be clear from what has been said in connection with Fig. 4, if the rolling motions of the ship are in a plane at right angles to the axis 74, then said precessional movements will be in opposite directions, while if said rolling motions are in planes intermediate of those just supposed, the precessional errors will take on values corresponding to the inclinations of said planes.

That is to say, when the rolling motions of the ship are in planes making various angles to the planes of axis 115, the precessional tendencies will be correspondingly changed. But, whatever value they may have, it is evident that they must be suppressed before they manifest themselves on a substantial scale.

In other words, a little consideration will show that such precessional movements if allowed to take place would be disastrous to the accuracy of a gyro compass; and especially would this be so when it is remembered that not only are some of said movements cumulative, as just disclosed, but the rocking movements of a ship often being rhythmic, said precessional movements are liable to get in step with said rocking movements. As the parts are possessed of considerable inertia and may have a large momentum, they may act in time after the manner of a pendulum to which rhythmic impulses are being imparted, to the end that the indications of the card 112 may be worse than worthless.

The suppressing of these said precessional tendencies due to a pendulous motion of the center of gravity of the wheel 118, around the axis 74, or in a plane making an angle with said axis, is accomplished by the stabilizing gyros 100 and 101 as follows:—

Suppose the center of gravity of the wheel system to be located at the intersection of the axes 115 and 66, and that it has a tendency to move in any plane at all around the axis 74. If the plane of movement be at right angles to axis 74, or in that of the axes 115 and 66, then the wheel 118 will be tending to turn on the pivots 67. This it can readily do when not running, but it cannot turn on said pivots while running, owing to its well known gyroscopic properties, and therefore, such tendencies to move the center of gravity of the wheel 118 will be suppressed at once, by its own gyroscopic action. It might be remarked, however, that even if such tendencies were not suppressed, any errors would be in opposite directions as the rocking motion reversed, and therefore, they would tend to be self-corrective.

Next, let us suppose that the center of gravity of the wheel 118 has a tendency to move around an axis 740 which is parallel to and located above the axis 66, or to move in a plane perpendicular to the plane first supposed. Such a tendency to move on the part of the center of gravity of wheel 118 will bring pressure on the pivots 67 in the common plane of the axes 74 and 115, which pressure will be transmitted in said plane to pivots 57 and 63, and they in turn will transmit it to pendulous frame 53, tending to swing the latter around the common axis of pivots 49 and 50, as a center.

But, any such motion from frame 53 will be resisted by stabilizing gyro 101, for example, for said gyro will maintain its plane of rotation and tend to precess around its vertical pivots 125, which will prevent said frame 53 from moving about its pivots 49 and 50 at all.

Next, suppose the plane of motion of the center of gravity of the wheel 118 makes different angles with the two planes just considered. It is evident in such cases that the suppressive effects of both the gyroscopic action of the wheel 118 itself and of the stabilizing gyro 101 will be brought into play, and that the value of each effect will vary with said angles. The combined efforts of both agencies, however, will at all times suppress any movement at all of the center of gravity of the wheel 118.

In addition to the pendulous action of the wheel center around the axis 74, on the ball bearing trunnions 67, there will be a pendulous action of the supporting frame system around the axis 116, and around an axis at right angles thereto passing through the gimbal pivots 49 and 50. That is to say, the supporting frame 53 and its associated parts being hung from the pivots 47 and 48, 49 and 50, the ordinary cardanic suspension, the center of gravity of this said frame system is below its points of suspension, and of course, it is pendulous. Should it be allowed to swing at all, the evil effects that would follow would be very disastrous, and therefore, it constitutes an important feature of this invention, as will be further emphasized below, that the stabilizing gyros 100 and 101 are provided. These said gyros having their planes of rotation disposed at right angles as indicated will not only powerfully resist the pendulous motions of the center of gravity of the frame system, but they will likewise resist other motions of said system, about to be disclosed, and therefore, they serve to maintain the parts in their normal and operative positions under all conditions.

Suppose, for example, the center of gravity of the frame 53 and its associated parts to be located in the ball bearing 60, and it has a tendency to swing in the plane of axes 66 and 115, around the axis 116, as a center. This tendency would at once be felt by the stabilizing gyro 100 which would immediately suppress the motion and tend to precess around its vertical axis 128.

Next, suppose the center of gravity of the frame system has a tendency to swing in a plane at right angles to that just considered, or in the common plane of axes 116 and 115, around the axis of pivots 49 and 50. In such case the stabilizing gyro 101 would at once suppress said tendency and precess around its vertical pivots 125. Of course, it follows that any tendencies of the center of gravity of the frame system to swing in planes making various angles with those just considered will be suppressed by both of the gyros 100 and 101, and therefore it is clear that all errors due to pendulous movements of the frame 53 will be avoided.

In the meantime, the precessional movements just described of the gyros 100 and 101 being preferably resiliently restrained, as by the springs 105, 106, 108 and 109, they will at all times retain their approximate relation to wheel 118 and follow up ring 58.

It should be observed that in any case the moment of the movement of any center of gravity is relatively small because its velocity is never allowed to have an appreciable value, while the resistance offered by the gyroscopic action is relatively great, so it results that the actual movements of the gyros 100 and 101 around their axes are very small indeed.

It will now be clear that the springs 105, 106, 108 and 109 serve to control the period and amplitude of oscillation of frame 53 as well as to maintain the gyros 100 and 101 at right angles to each other. It is evident it we strengthen said springs, the period and amplitude will be decreased, while by decreasing their power said period and amplitude will be increased.

It will further be observed that the greater is the pendulous mass, the larger must be the size, or the higher must be the speed of rotation of the gyros 100 and 101.

It will now be clear that the stabilizing gyros and wheel 118 may be said to suppress all pendulous motions of the frame and wheel systems, while the follow up ring 58 and its associated parts correct for errors due to friction, with the result that all forces tending to direct the compass away from the meridian are eliminated.

Coming now to Figs. 9 and 10, which show a somewhat modified form of pivots 67, the latter, as well as the tubular members 69 are somewhat extended beyond their dimensions illustrated in Fig. 2, but their structure is otherwise the same. On the extended ends of the members 69 is supported a pair of brackets 130 each having a foot member 131 carrying a pair of magnets 132, and 133. One end of the coil of each magnet 132 is joined by a wire 134 to battery 80, and the other end of each of said coils is joined by a wire 135 to wire 88 and contact 86 as shown. One end of the coil of each magnet 133 is joined by a wire 136 to wire 134, and the other end of each coil is connected by wire 138 to wire 87 and contact 85 all as will be clear from Fig. 9.

The extended ends of the pivots 67 are each provided with an armature 140 rigid with its corresponding pivot 67, and as said pivots are loosely disposed in their respective ball bearings as shown in Fig. 2, said armatures may readily oscillate said pivots in said bearings and prevent them from sticking or failing to function properly.

In other words, owing to the trying conditions under which delicate bearings are used at sea, I may keep the pivots such as 67 in a state of constant agitation for each time the roller 84 makes circuit with contact 84 or 85, one or the other of magnets 132, 133, will be energized and said pivots be thus oscillated on their axes.

It is well known that a weighted gyro, or one having the center of gravity of the wheel system below the center of suspension, as is the case here, will, owing to the rotation of the earth, automatically place its rotative axis 66 in the plane of the meridian.

Therefore, it follows, from what has been disclosed above that, as the compass moves over the earth's surface, the effect of gravity will always maintain the axis 115 vertical, and the rotative effect of the earth will cause the axis 66 to be maintained in a north and south plane, with the result that the compass will automatically seek the true north, and persist in pointing to the North Pole unless extraneous forces deflect it. Such forces are those due chiefly to precession, friction, etc., above mentioned. But, as the precessional forces are suppressed by the stabilizing gyros 100 and 101, and the frictional forces are corrected for by the follow up ring 58, these said forces do not in this compass prevent the card 112 from automatically seeking the true north, nor from persisting in keeping it when it is once found. The accuracy of the indications of said card are enhanced in actual use at sea by the pivot agitating mechanism shown in Figs. 9 and 10, for the effects of the sea air are thus prevented from rendering said pivots sluggish.

It is obvious that those skilled in the art may vary the details of the construction, as well as the arrangement of parts without departing from the spirit of my invention, and therefore, I do not wish to be limited to the above disclosure except as may be required by the claims.

What I claim is:—

1. In a gyroscopic compass adapted to be carried on an unsteady platform, the combination of a weighted gyroscopic directive element; pendulous supporting means therefor adapted to rotate around a vertical axis; means adapted to compensate for errors due to friction while said supporting means is moving around said axis; and stabilizing means adapted to suppress precessional movements due to motions of said platform substantially as described.

2. In a gyroscopic compass adapted to be carried on a rocking platform, the combination of a weighted gyroscopic directive element; a pendulous supporting means for said element adapted to oscillate about a vertical axis; means mounting said supporting means for oscillation about a horizontal axis; and gyroscopic stabilizing means adapted to suppress precessional motions due to motions of said platform, substantially as described.

3. In a gyroscopic compass the combination of a weighted gyroscopic directive element; a pendulous supporting means for said element mounted for oscillation around vertical and horizontal axes; means to compensate for errors due to friction when said supporting means is moving about said vertical axis; and means comprising a pair of gyroscopic stabilizing devices disposed at an angle to each other adapted to suppress pendulous movements of said supporting means around said horizontal axes, substantially as described.

4. In a gyroscopic compass the combination of a weighted gyroscopic directive element comprising a horizontally pivoted casing and a gyroscopic wheel pivoted in said casing; a pendulous supporting means for said element mounted for oscillation around vertical and horizontal axes; means comprising a follow up ring and motor to compensate for errors due to friction when said supporting means is moving about said vertical axis; and means carried by said pendulous supporting means comprising a pair of gyroscopic stabilizing devices disposed at an angle to each other adapted to suppress pendulous movements of said supporting means around said horizontal axes, substantially as described.

5. In a gyroscopic compass for use on shipboard the combination of a weighted gyroscopic directive element; means for horizontally pivoting said element; a supporting frame; means for horizontally pivoting said supporting frame; vertical pivots for said first named means carried by said supporting frame and around which the latter is adapted to move; and a pair of stabilizing gyroscopes carried by said frame, substantially as described.

6. In a gyroscopic compass for use on shipboard the combination of a weighted gyroscopic directive element; means for horizontally pivoting said element; a supporting frame; means for horizontally pivoting said supporting frame; vertical pivots for said first named means carried by said supporting frame and around which the latter is adapted to move; means associated with said supporting frame for compensating for errors due to friction when said frame is moving around said vertical pivots; and a pair of stabilizing gyroscopes carried by said frame, substantially as described.

7. In a ship's compass the combination of a weighted gyroscopic directive element; a binnacle comprising a cardanic suspension; a pendulous frame carried by said suspension; a pair of angularly disposed stabilizing gyroscopes carried by said frame; vertically disposed pivots carried by said frame; a follow up ring carried by said pivots; a member inside said following-up ring carried by said vertical pivots; and horizontally disposed pivots carried by said member supporting said directive element, substantially as described.

8. In a ship's compass the combination of a weighted gyroscopic directive element; a binnacle comprising a cardanic suspension; a pendulous frame carried by said suspension; a pair of angularly disposed stabilizing gyroscopes carried by said frame; vertically disposed pivots carried by said frame; a follow up ring carried by said pivots; a member inside said follow up ring carried by said vertical pivots; a gear carried by said follow up ring; a motor and pinion carried by said frame for driving said gear; a compass card associated with said member; and horizontally disposed pivots carried by said member supporting said directive element, substantially as described.

9. In a gyroscopic compass adapted to be carried on an unsteady platform, the combination of a weighted gyroscopic directive element provided with horizontal pivots; pendulous supporting means therefor adapted to rotate around a vertical axis; means adapted to compensate for errors due to friction while said supporting means is moving around said axis; and stabilizing means adapted to suppress precessional movements due to motions of said platform, substantially as described.

10. In a gyroscopic compass adapted to be carried on a rocking platform, the combination of a weighted gyroscopic directive element provided with horizontal pivots; electro-magnetic means for oscillating said pivots on their axes; a pendulous supporting means for said element adapted to oscillate about a vertical axis; means mounting said supporting means for oscillation about a horizontal axis; and gyroscopic stabilizing means adapted to suppress precessional motions due to motions of said platform, substantially as described.

11. In a gyroscopic compass the combination of a weighted gyroscopic directive element; provided with loosely mounted horizontally disposed pivots; means comprising a pair of magnets and an armature for oscillating one of said pivots on its axis; a pendulous supporting means for said element mounted for oscillating around vertical and horizontal axes; means to compensate for errors due to friction when said supporting means is moving about said vertical axis; and means comprising a pair of gyroscopic stabilizing devices disposed at an angle to each other adapted to suppress pendulous movements of said supporting means around said horizontal axes, substantially as described.

12. In a gyroscopic compass the combination of a weighted directive element; a pendulous supporting frame for said element; and a pair of angularly disposed stabilizing gyroscopes carried by said frame, substantially as described.

13. In a gyroscopic compass the combination of a weighted directive element; a pendulous supporting frame for said element; and a pair of angularly disposed stabilizing gyroscopes mounted on vertical pivots carried by said frame, substantially as described.

14. In a gyroscopic compass the combination of a weighted directive element; a follow up ring; a pendulous supporting frame for said element and ring; and a pair of angularly disposed stabilizing gyroscopes carried by said frame and yieldingly connected to said ring, substantially as described.

15. In a gyroscopic compass the combination of a weighted directive element; a pendulous supporting frame carrying said element; a stabilizing frame carried by said supporting frame; a follow up ring carried by said supporting frame; a pair of gyroscopic stabilizing members carried by said stabilizing frame; yielding connections between said follow up ring and said stabilizing frame; and yielding connections between said stabilizing frame and said gyroscopic members, substantially as described.

16. In a gyroscopic compass for use on a moving, unsteady, platform, the combination of a weighted gyroscopic directive element; means associated with said element for indicating the true north; pendulous supporting means for said element adapted to assume a normal fixed position relative to the horizontal plane as the platform moves over the earth's surface; and means comprising angularly disposed gyroscopic devices tending to prevent said supporting means from being moved out of its normal position by the unsteady movements of said platform, substantially as described.

17. In a gyroscopic compass for use on a moving, unsteady platform, the combination of a weighted gyroscopic directive element; pendulous supporting means for said element adapted to assume a normal fixed position relative to the horizontal plane as the platform moves over the earth surface; and means comprising angularly disposed gyroscopic devices provided with vertically disposed pivots tending to prevent said supporting means from being moved out of its normal position by the unsteady movements of said platform, substantially as described.

18. In a gyroscopic device for indicating the true north the combination of a gyroscopic directive element; a support for said element; a bearing adapted to turn about said support; means for compensating for errors due to friction generated between said bearing and support; a pendulous supporting frame for said last named means; and a pair of angularly disposed stabilizing gyroscopic devices carried by said frame, substantially as described.

In testimony whereof I affix my signature, in presence of two witnesses.

GEORGE A. ROSSITER.

Witnesses:
J. E. BEATTIE,
CHAS. G. ANDERSON.

Copies of this patent may be obtained for five cents each, by addressing the "Commissioner of Patents, Washington, D. C."